Jan. 29, 1929.　　　　　　　　　　　　　　　　1,700,526
A. WOLLENSAK
PHOTOGRAPHIC SHUTTER
Filed Aug. 25, 1925　　　　　3 Sheets-Sheet 2
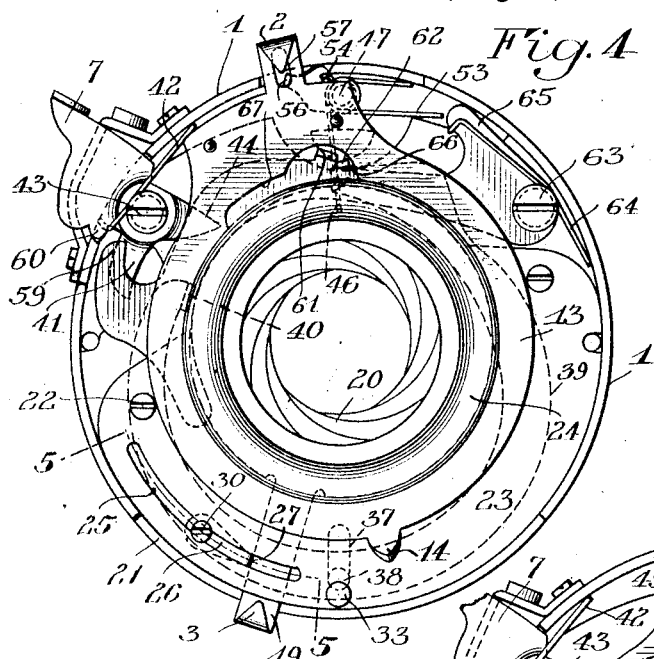
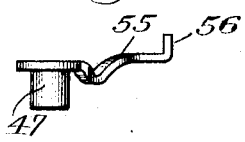
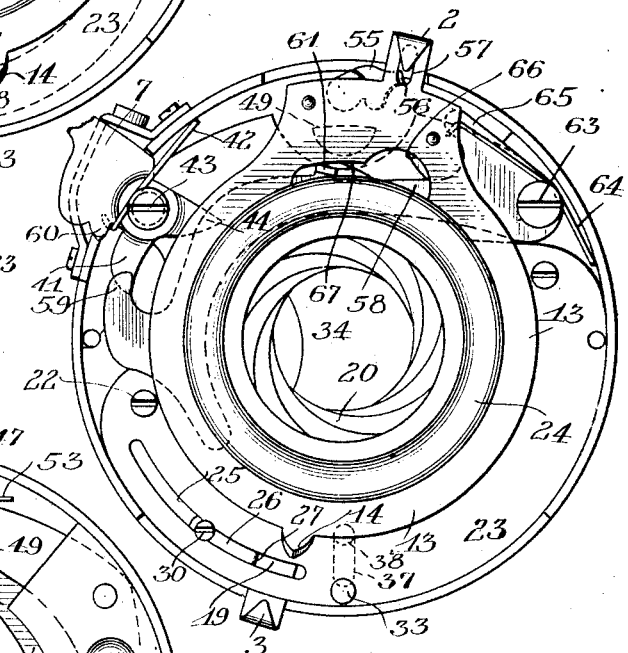
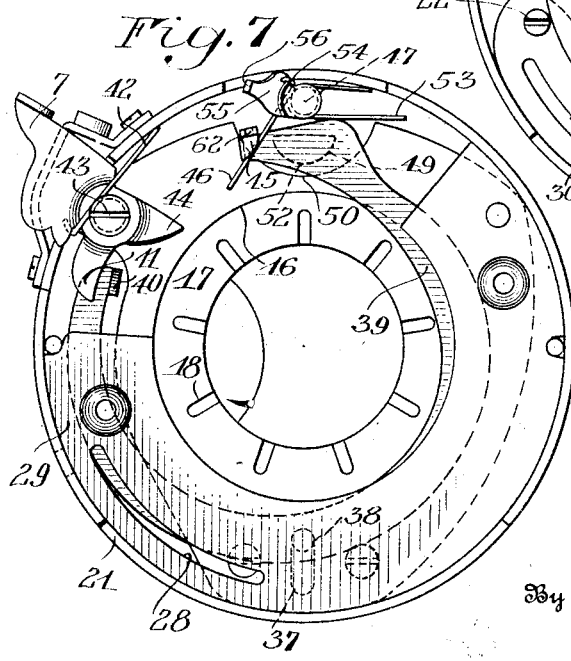
Inventor
Andrew Wollensak
his Attorney

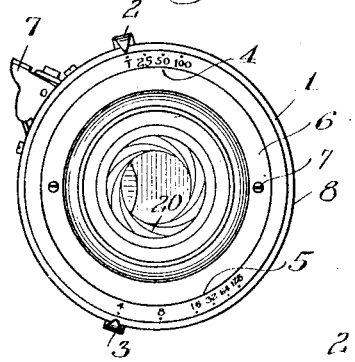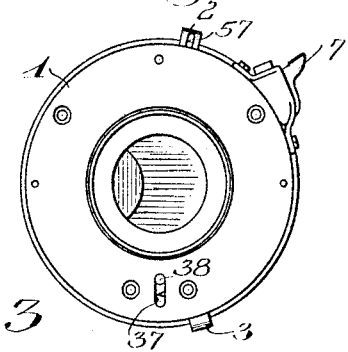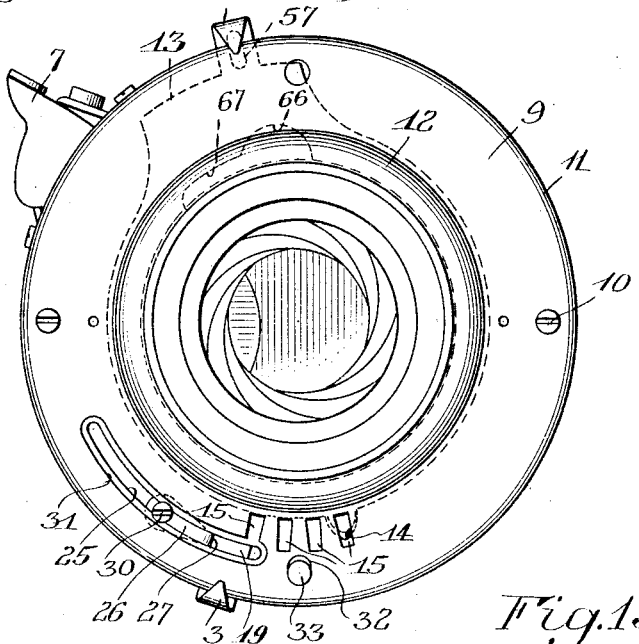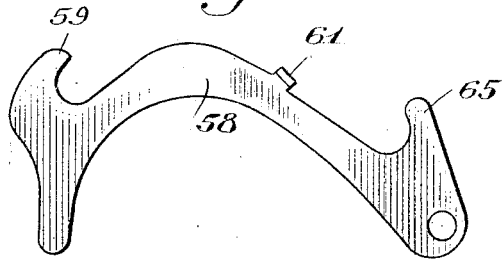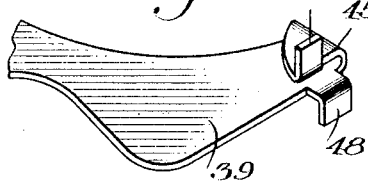

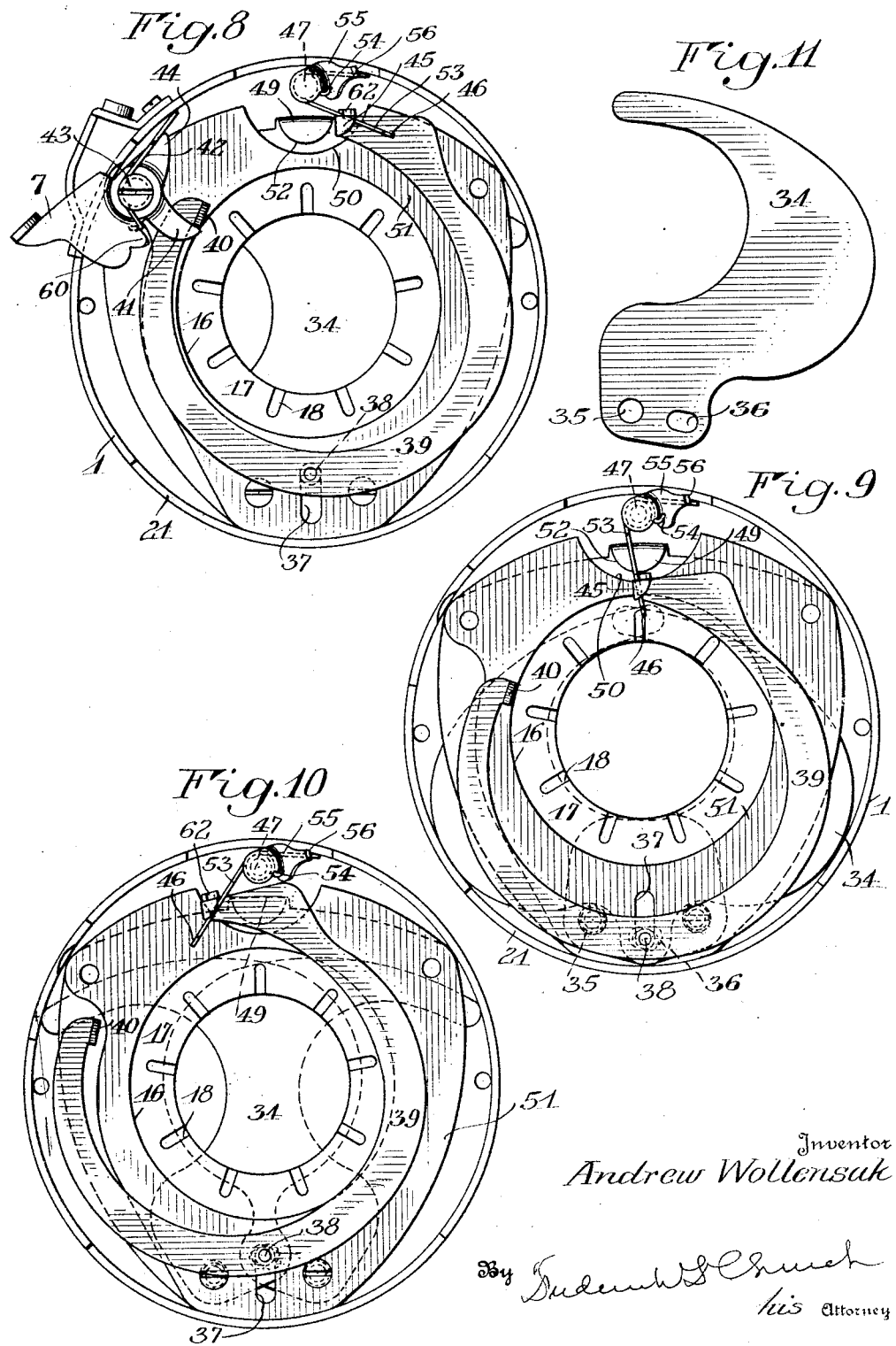

Patented Jan. 29, 1929.

1,700,526

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

PHOTOGRAPHIC SHUTTER.

Application filed August 25, 1925. Serial No. 52,297.

My present invention relates to photography and more particularly to photographic shutters. In a way, or as to certain of its features, this invention is an improvement upon that disclosed in my prior pending application Serial No. 37,981, filed June 18, 1925. It has for its object to provide improved means for regulating the speed of a shutter such as that shown in my said application and also improved means in connection therewith for regulating the diaphragm opening of the shutter. To these and other ends the invention resides in certain improvements and combinations of parts all as will be hereinafter more fully described, the novel features being pointed out in the claims at the end of the specification.

In the drawings:

Figure 1 is a front view of a photographic shutter constructed in accordance with and illustrating one embodiment of my invention.

Figure 2 is a rear view thereof;

Figure 3 is an enlarged front view with the scale ring removed;

Figure 4 is a front view with the scale ring and cover plate removed showing the parts in a position wherein the blades are open for a time exposure and the diaphragm is also open;

Figure 5 is a detail section on the line 5—5 of Figure 4 showing the diaphragm adjusting stop;

Figure 6 is also a view with the scale and cover plate removed showing the parts in position for a high speed exposure but with the blades closed;

Figure 7 is a front view showing the diaphragm and its retaining plate removed and with the parts adjusted for a slow or time exposure, the blades being closed;

Figure 8 is a view with all upper plates removed showing the parts in position for a high speed instantaneous exposure at the point at which the blades are about to be opened;

Figure 9 is a view similar to Figure 8 but with further overlying parts removed showing further progress of an instantaneous exposure the blades being open;

Figure 10 is a view similar to Figure 9 but showing the blades in closed position;

Figure 11 is a plan view of one of the blades;

Figure 12 is a plan view of the time stop attached;

Figure 13 is a fragmentary perspective view of the master lever and

Figure 14 is a side view of the spring tension regulator for the master member spring.

Similar reference numerals throughout the several views indicate the same parts.

The general operation of the shutter herein disclosed is the same as that of the shutter set forth in my said pending application except that in the present case an iris diaphragm is used to cut down or increase the light admission. Referring in a general way to Figure 1, the present embodiment of the invention is illustrated in connection with a shutter of the automatic type in which 7 is the operating member and 2 indicates the time control indicator while 3 indicates the diaphragm adjusting indicator. The indicators 2 and 3, respectively, cooperate with time and diaphragm scales 4 and 5 on a scale plate 6 secured by screws 7' to the front of an annular shutter case 8. The scale plate is actually attached to a cover plate 9 best shown in Figure 3. This cover plate is secured to the shutter case 1 by screws 10. It has marginal flanges 11 fitting over the case and is also provided with a central collar 12 surrounding the lens opening.

On the under side of the cover plate 9 is a bearing in which turns a ring 13 of which the timing regulator 2 is a part. Diametrically opposite to the said indicator 2 on the ring is a spring stop 14 adapted to yieldingly latch with any one of a plurality of stop openings 15 in the cover plate 9 corresponding to the readings on the scale 4. In this way the indicator 2 is held at any one of the scale adjustments and controls the time and instantaneous exposures accordingly in a manner that will be hereinafter described.

In the bottom or rear of the case is a recess 16 in which is mounted an annulus 17 having slots 18 to receive the pivots of an ordinary iris diaphragm ring provided with an arm 19 terminating in the indicator 3 before referred to and the turning of which opens and closes the leaves 20 of the diaphragm. The arm 19 extends through a slot 21 in the case 1 to bring the indicator 3 in position to overlie the periphery of the cover plate 9 and to project into proximity to the scale plate 6. Beneath the ring 13 and concentric therewith but secured to the casing 1 by screws 22 is a segmental plate 23 (Figures 4 and 6.) It has a forwardly projecting collar 24 forming a bearing for the ring 13 which holds the latter close to the cover plate 9 in which the openings 15 are formed. The ring 13 is resilient and as its indicator 2 is adjusted to different readings on the scale 4 of the scale plate 6, the lug 14 snaps into one or another of the recesses 15 in the cover plate 9 to give the different time adjustments hereinbefore referred to and hereinafter described.

The cover plate 9, acting in conjunction with the segmental plate 23, also carries a stop that controls the opening of the diaphragm blades 20 through the operating arm 19, the purpose being that the diaphragm may be initially set at the factory for a maximum opening to which the particular lens that the camera is fitted with is adapted.

For this purpose the segmental plate 23 is provided with a segmental slot 25 in which is adjustable a dog 26 having a downwardly turned finger 27 riding in a slot 28 in a mounting plate 29 in the interior of the shutter. The diaphragm regulating arm 19, operating in its slot 21 in the casing, passes between plates 23 and 29, and the finger 27 on the stop device, travelling in the slot 28, constitutes an abutment that limits the movement of the diaphragm arm 19. A set screw 30 threaded into the stop 26 bears against the outer or forward surface of plate 23 and clamps it against the same. This screw is set at the factory during the initial assembling of the shutter and is not supposed to be thereafter disturbed because, as before said, it limits the opening movement of the diaphragm blades 20 as shown in Figures 4 and 6, and also in Figure 3, to give the proper maximum opening and light entrance for the particular lens used or the particular lens fitted to that particular shutter, the lenses being apt to vary in this respect, that is, their capacity to transmit properly a volume of light rays. After the adjustment is made, a slot 31 in the cover plate 9 through which the adjusting screw 30 is preliminarily accessible, is completely covered by the scale plate 6 as shown by a comparison of Figures 1 and 3 and the user has no intimation that an adjustment of this kind exists. He should not because he has no proper occasion to use it, it being essentially a factory adjustment.

As before stated, a collar 24 on the plate 23 forms a bearing for the time ring 13 holding it to the cover plate 9 and in order to center these plates properly with relation to each other, the cover plate 9 is provided with an opening 32 into which fits a pin or a lug 33 on the segmental plate 23.

The blade mechanism employed is of the pivoted blade opposite movement type. The right hand blade is shown at 34, Figure 11. It is pivoted at 35 within the casing and each has a slot 36 across from its pivot by means of which it is actuated. The slots 36 correspond to or are coincident with a slot 37 in the bottom of the casing 1 (2). A pin 38 on a master member engages in the slots 36 and 37 and, through a reciprocatory movement about to be described, actuates the blades 34 to open and close positions. The master member referred to consists of a yoke-shape annular member 39 having at one end a lug 40 adapted to be engaged by a finger 41 on the operating lever 7. The engagement is such that the operating lever and finger will move the master member in a clock-wise direction when the lever is depressed as shown in Fig. 8 but will thereafter slip off of the same and re-engage when returned, the master member being resilient so that it yields in a rearward direction and re-engages in a forward direction and the lug 40 being cam shape so that the finger 41 will ride over it as the operating lever 7 returns to the normal position of Figs. 1, 3 and 7 for instance. The operating lever 7 has a tendency to assume the normal position of said figures through the influence of a spring 42 coiled about its pivot 43 and reacting against a lateral wall of the casing. A stop arm 44 on the operating lever 7 is also adapted to engage the casing wall, limit the movement of the arm after the finger 41 has slipped off of the lug 40.

The opposite arm of the master lever yoke 39 is also provided with a lug 45 shown in detail in Figure 13. As best shown in Figs. 7 and 8, this lug is engaged by an arm 46 of a spring coiled about a pivot post 47 fixed to the bottom of the casing. This spring normally holds the master member 39 in the position of Fig. 10, that is, having passed its center in a clock-wise direction, it raises the master member to an extent that carries its pin 38 to the top of its slot and holds the blades 34 closed as in Figs. 7 and 10.

There is, however, on the lug 45 or at least on this arm of the master member an extension or lug 48, which lug cooperates with a segmental switch cam 49. As clearly shown in Figs. 8 and 9 this switch cam has a straight top and a curved bottom portion and spaced from the latter to provide a track or guideway is a complementary curved or segmental indented portion 50 on a plate 51 that is also fixed. The guide-way is indicated at 52. The normal relation of the lug 48 to these cams and to the guide-way 52 is that shown in Figs. 7 and 10, wherein the main-spring 46 is across its center on the left side of its movements and is pressing upwardly against lug 45 to hold the master member 39 in a raised position and, through the pin 38, to hold the blades 34 closed.

When the operating lever 7 is depressed as in Fig. 8 and the finger 41 thereon operatively engages the lug 40 on the opposite arm of the master member 39, it swings the master member to the right against the tension of main-spring 46. Before this spring has passed its center however and is still urging the master member in an upward direction to hold the blades closed, the lug 48 moves on to the flat portion of the switch cam 49, which is at approximately the normal level thereof As the main-spring 46 is moved across its center and develops a tendency to thrust the master member downwardly and open the blades, it is prevented from doing so by the flat portion of the cam until the operating member has progressed the master member sufficiently for the lug 48 to slip off of the flat portion 49 and enter the guide-way 52, as shown in Fig. 8. The main-spring being then fully wound and being in a position to exert its pressure downwardly instead of upwardly, carries the lug around in a segmental path through the guide-way 52, opening the blades inasmuch as the finger 41 on the operating lever 7 has, in the meantime, slipped off of the lug 40. As the spring crosses its center, as shown in Fig. 9, the blades are open because of the maximum downward thrust on the master member 39 at this point. Thereafter the tendency of the spring is in an upward direction and from the position of Fig. 9 to that of Fig. 10 the spring raises the master member and closes the blades, the lug 48 resuming the initial position of Fig. 10.

In the practice of my present invention I provide means for supplementing the action of the main-spring 46 for the higher speeds of the shutter by furnishing an additional spring that adds its power to that of the spring 46 when desired. Furthermore I place the control of this supplemental spring and the extent to which it participates in the actuation of the master member 39 in the indicator lever 2. The supplemental spring is indicated at 53 and is also wound about the post 47. One end either engages or remains in a position to engage the lug 45 on the master member 39 along with spring 46. The other end is indicated at 54 and hooks over a regulating arm 55 which turns in a suitable pivot bearing on the post 47. It will be seen that by turning the lever 55 to the left the tension of supplemental spring 53 will be reduced even to the point at which it will exert no pressure whatever upon the master member lug 45 while in turning it to the right as in Fig. 9 it will add to the spring 46 a maximum of its own strength to that movement of the master member which opens and closes the blades after the master member is released by the operating member. The inoperative position of spring 53 for the lower speeds of the shutter is shown in Fig. 7.

The lever arm 55, for purposes of adjustment is provided with a lug 56 which takes into a slot 57 in controlling lever 2. Therefore when controlling lever 2 is moved back and forth to different adjusted positions in which the spring finger 14 thereon engages with the various slots 15 in the cover plate 9 as previously described, it moves the arm 55 to place a greater or less or no tension upon supplemental spring 53 and the speed of the shutter is accordingly regulated with one or both springs in operation as the case may be.

There is a time-control lever 58 provided having an arm 59 adapted to be engaged by a separate finger 60 on the operating lever 7 to throw a lug 61 on such time-lever into and out of the path of a lug 62 on the master member 39, as the master member and the time-lever are jointly moved through depressing the operating lever. The time-lever is pivoted at 63 and coiled about the pivot is a spring 64 reacting against the shutter case at one end and having its other end engaging an arm 65 on the time-lever so that it will tend to turn the timing lever in a clock-wise direction and to carry the lug 61 into the path of lug 62 on the master member.

During the time exposure and when the operating lever 7 is depressed the following movements take place: The operating lever carries the lug 48 of the master member across the flat surface of the switch cam 49, as previously described. While it is doing so and before it has slipped off of the master member its finger 60 both depresses and releases the arm 59 on the time-lever so that stop lug 61 on the latter moves back into guide-way 52 by the time that lug 48 on the master lever has dropped into the guide-way through the release of the master member by the operating lever. The result is that the return of the master lever under the influence of the main-spring is halted half way with the shutter blades open, as shown in Fig. 4, by the engagement of lug 62, associated with lug 48 on the master member, with the lug 61 of the stop lever. Upon again depressing the operating lever 7, its first action is to depress the time lever 58 and release the time stop 61 from engagement with the master member so that the latter returns to its initial position of Fig. 7 too early for the operating lever to engage it at all.

Of course, during an instantaneous or automatically timed exposure, it is necessary to repress the action of this time-lever 58, so that the master lever will return to normal position in one movement instead of with two movements. I accomplish this through the medium of the time-control ring 13 of which the time-control indicator 2 forms a part. As previously described this time-control ring increases and diminishes the tension of the springs acting upon the master member and as there is no advantage in having a strong spring action during a time exposure it is advantageous to have the time ring actuate the time-lever at the same time that it is regulating the spring tension. I, therefore, provide the time-ring 13 with a cam, having an enlarged portion 66 and a communicating narrow portion 67 through which the lug 61 on the time-lever projects. When the ring 13 is moved to the right, as in Fig. 6, to increase the tension of supplementary spring 53, as previously described, the portion 67 of the ring holds lug 61 on the time-lever depressed, so that it cannot move into the path of the master member. When, however, the ring is moved in the opposite direction and the time-control indicator 2 is set for a time exposure, the wide opening portion 66 of the cam thereon is presented in the path of lug 61 on the time-lever and the latter is thereby given such freedom of movement that it may swing into and out of the path of the master member, as shown in Fig. 4.

I claim as my invention:

1. In a photographic shutter, the combination with a blade mechanism, of a master member adapted to actuate the same, a mainspring for moving the master member, a supplementary spring adapted to increase the spring tension on the master member and means for regulating the tension of the supplementary spring.

2. In a photographic shutter, the combination with a blade mechanism and a master member for actuating the same, of a mainspring and an auxiliary spring for moving the master member in one direction and means for moving the auxiliary spring into and out of contact with the master member and for increasing and decreasing its tension.

3. In a photographic shutter, the combination with a blade mechanism, a master member for actuating the same and an operating member for moving the master member in one direction, of a post, a pair of springs coiled thereon and adapted to engage the master member to move it the other direction, and a device rotatable on the post and adapted to increase or decrease the tension of one of said springs.

4. In a photographic shutter, the combination with a blade mechanism and a master member for actuating the same, of a time stop, a controlling device therefor, a spring adapted to act upon the master member and having its tension controlled by the controlling member, and a second spring also acting upon the master member independently of the first spring and of said controlling member.

5. In a photographic shutter, the combination with blade mechanism, a master member for actuating the same, a pair of springs adapted to act on the master member and a time stop for the latter, of a controlling device arranged to increase or decrease the tension of one of the springs and to also control the time stop.

6. In a photographic shutter, the combination with the blade mechanism, a master member for actuating the same, a time stop for the master member and a post adjacent to the latter, of a spring coiled about said post to cooperate with the master member at one end, an arm pivoted on said post and engaged by the other end of the spring to increase or diminish the tension thereof and means for adjusting the position of the arm, and also controlling the time stop.

7. In a photographic shutter, the combination with blade mechanism, a master member for actuating the same, and a post adjacent to the latter, of a spring coiled about said post to cooperate with the master member at one end, an arm pivoted on said post and engaged by the other end of the spring to increase or diminish the tension thereof and means for holding the arm in different positions of adjustment.

8. In a photographic shutter, the combination with blade mechanism, a master member for actuating the same, a time stop for the latter and a post adjacent to the master member, of a spring coiled about the post and having one end adapted to engage the master member, an arm pivoted on the post and engaged by the other end of the spring to regulate its tension, and a swinging member operable from the exterior of the shutter to control the time stop and having sliding engagement with the arm to actuate it also.

9. In a photographic shutter, the combination with a blade mechanism, a master member for actuating the same, a spring for actuating said master member and a time stop movable into and out of the path of the master member, of a rotatable ring having a cam portion adapted, in one position of the ring to hold the time stop inoperative or out of said path, and provided with a cutaway portion adapted, in another position of the ring to permit freedom of movement of the time stop into the path of the master member, and means controlled by the movement of said rotatable ring for varying the tension of said spring.

10. In a photographic shutter, the combination of a shutter casing provided with a centrally arranged boss surrounding the lens opening, blade mechanism, a master member for actuating the blade mechanism, a spring adapted to engage the master member and a time-regulating ring having a rotative movement on the boss and adapted to vary the tension of the spring.

11. In a photographic shutter, the combination of a shutter casing provided with a centrally arranged boss surrounding the lens opening, blade mechanism, a master member for actuating the blade mechanism, a spring adapted to engage the master member, a time stop for the latter, a time regulating ring having a rotative movement on the boss and provided with a cam portion arranged to control the position of the time stop, and means controlled by the movement of said regulating ring for varying the tension of said spring.

12. In a photographic shutter, the combination of a shutter casing, provided with a centrally arranged boss surrounding the lens opening, blade mechanism, a master member for actuating the blade mechanism, a spring adapted to engage the master member, a time stop for the latter, a cover plate for the casing having a plurality of stop openings therein and a time regulating ring having a rotating bearing on the boss and provided with a spring finger engaging the underside of the cover plate and adapted to cooperate successively with the stop opening therein to hold the ring in different adjusted positions.

ANDREW WOLLENSAK.